(No Model.)
W. V. WALKER.
CULTIVATOR.
No. 357,250. Patented Feb. 8, 1887.
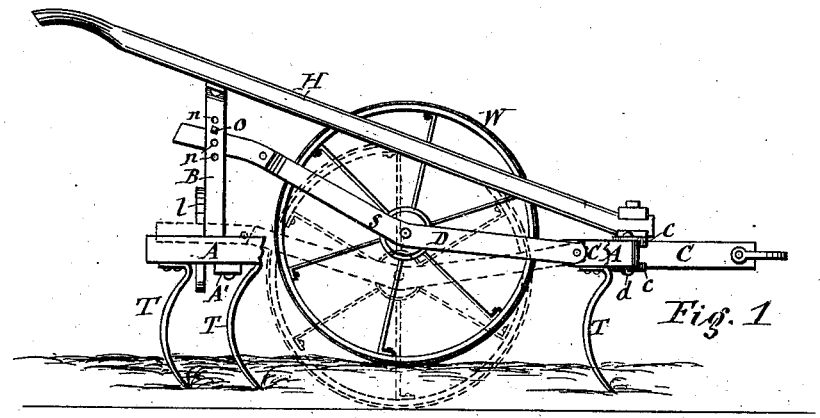
Fig. 1
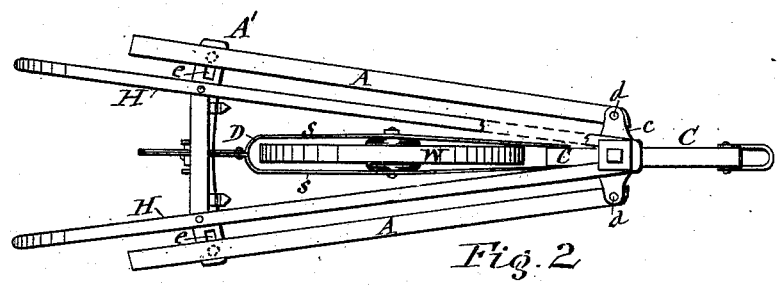
Fig. 2
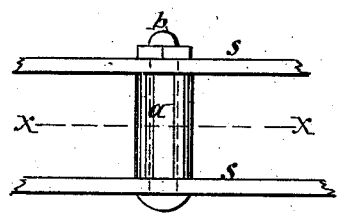
Fig. 4
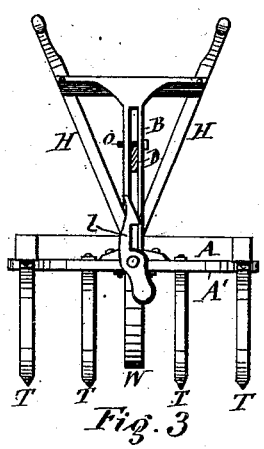
Fig. 3
Fig. 5
WITNESSES:
A. F. Walz,
C. Bendixon.
INVENTOR:
William V. Walker
per Dull, L. assist Dull
Attys.

UNITED STATES PATENT OFFICE.

WILLIAM V. WALKER, OF MORAVIA, NEW YORK, ASSIGNOR OF ONE-HALF TO WILLIAM J. H. PARKER, OF SAME PLACE.

CULTIVATOR.

SPECIFICATION forming part of Letters Patent No. 357,250, dated February 8, 1887.

Application filed September 17, 1886. Serial No. 213,763. (No model.)

*To all whom it may concern:*

Be it known that I, WILLIAM V. WALKER, of Moravia, in the county of Cayuga, in the State of New York, have invented new and useful Improvements in Cultivators, of which the following, taken in connection with the accompanying drawings, is a full, clear, and exact description.

This invention relates to the class of cultivators which have the frame carried adjustably on a single central wheel, by means of which the cultivator can be raised to clear the ground while going to and from the field, or when turning the cultivator about in the field.

The invention consists in an improved construction and combination of the component parts of the cultivator-frame and its adjustable support on the carrying-wheel, whereby the adjustment of the cultivator is greatly facilitated, all as hereinafter more fully described, and specifically set forth in the claim.

In the annexed drawings, Figure 1 is a side elevation of a cultivator embodying my improvements, one side of the frame being broken away to show other important features. Fig. 2 is a top plan view of the same. Fig. 3 is a rear end view. Fig. 4 is an enlarged detached view of the wheel-journal and its attachment to the beam, by which it is connected to the cultivator; and Fig. 5 is a transverse section on line $x\,x$, Fig. 4.

Similar letters of reference indicate corresponding parts.

A A represent the laterally-adjustable divergent side beams of the cultivator-frame, said beams being connected at the front ends between the end portions of clip-plates $c\,c$, which are placed across the top and bottom thereof, and have the attaching-bolts $d\,d$ passing vertically through them and through the intervening ends of the side beams, so as to allow the rear ends of said beams to be swung laterally and spread a greater or less distance apart, according to the width between the rows of plants to be cultivated. Across the under side of the rear ends of the two side beams is extended a bar, A', having longitudinal slots $e\,e$, for the reception of the bolts by which the said bar is clamped onto the beams, so as to retain them in their adjusted positions.

On the rear end of the frame A, or cross-bar A' thereof, is mounted a vertically-slotted standard, B, which is formed with laterally-projecting arms at its upper end, and upon said arms are fastened the rear ends of the handles H H, the forward ends of which are secured to the top clip-plate $c$.

T T denote the cultivator-teeth, preferably formed of spring-steel and curved in the usual manner.

Between the forward ends of the side beams of the frame A, and secured to the clip-plates $c\,c$, is the longitudinal central draft-beam, C, the forward end of which is provided with a clevis or otherwise adapted for the attachment of the horse or horses. The rear end of said draft-beam terminates a short distance back of the clip-plates $c\,c$ on the forward end of the frame A, and to said end of the draft-beam is hinged a beam, D, which is extended rearward longitudinally through the center of the frame, and has its free end adjustably connected to the standard B, so as to allow said beam to be raised or lowered, for the purpose hereinafter explained.

The beam D, I prefer to form of two metallic straps, $s\,s$, arranged side by side and pivoted at their forward ends to opposite sides of the rear end of the draft-beam C. The central and main portions of said straps are maintained apart a proper distance to receive the supporting-wheel W between them, and back of said wheel the straps $s\,s$ are united and pass through the vertical slot of the standard B.

The wheel W, I pivot on a chilled-faced journal $a$, introduced between the straps $s\,s$ and secured in position by an angular bolt, $b$, passing through the straps and through a corresponding angular channel through the axis of the journal, as represented in Figs. 4 and 5 of the drawings, the bolt being provided with a head and nut, respectively, at opposite ends, and, bearing against the outer sides of the straps, serves to clamp the straps against the ends of the journal $a$, and also allows the journal to be removed for placing the wheel W thereon.

The upper end portion of the standard B is provided with a series of holes, $n\,n$, at different elevations, and by means of a pin or bolt, $o$, inserted in one of said holes, the upward movement of the beam D is limited, so as to allow the wheel W to support the frame A in such an elevation in relation thereto as to cause the teeth T T to enter the ground to the desired depth.

To the rear side of the lower portion of the standard B is pivoted a latch or hook, l, which is weighted so as to stand normally in a position to engage the rear end of the beam D when depressed and retain it in its depressed position, and thereby cause the wheel W to stand at such an elevation in relation to the frame A as to carry the teeth T T clear from the ground when desired to turn about in the field, or in going to and from the field.

The aforesaid arrangement of the pivoted beam D, with the latch l on the rear end of the cultivator-frame, allows the person in charge of the cultivator to kick the latch out of engagement with the beam D when desired without stopping the motion of the cultivator.

Having described my invention, what I claim as new, and desire to secure by Letters Patent, is—

In combination with the central draft-beams, C, adjustable side beams, A A, carrying teeth T T, and the spreader-bar A', the vertically-slotted standard B, the longitudinal beam D, pivoted on the draft-beam C and having its rear end extended through the aforesaid standard and adjustably connected thereto, the wheel W, pivoted to the beam D at or near the center of the cultivator-frame, and the latch l on the rear end of the cultivator-frame, adapted to engage and release the beam D in its depressed position, substantially as described and shown.

In testimony whereof I have hereunto signed my name and affixed my seal, in the presence of two attesting witnesses, at Moravia, in the county of Cayuga, in the State of New York, this 21st day of August, 1886.

WILLIAM V. WALKER. [L. S.]

Witnesses:
TERRY EVERSON,
W. J. H. PARKER.